United States Patent [19]

Martin

[11] 4,187,941
[45] Feb. 12, 1980

[54] BALE RESTRICTIVE FLAP

[75] Inventor: E. Joel Martin, Narvon, Pa.

[73] Assignee: Sperry Rand Corporation, New Holland, Pa.

[21] Appl. No.: 1,115

[22] Filed: Jan. 5, 1979

[51] Int. Cl.² .............................................. B65G 11/12
[52] U.S. Cl. ..................... 193/5; 100/188 R; 193/45
[58] Field of Search ...................... 193/5, 32, 4, 44, 45, 193/2 C; 100/188 R, 188 RT; 56/473.5, 474; 414/780, 784, 754; 198/863, 406

[56] References Cited

U.S. PATENT DOCUMENTS

| | | | |
|---|---|---|---|
| 2,759,323 | 8/1956 | Nolt | 56/473.5 |
| 2,947,400 | 8/1960 | Murray et al. | 193/5 |
| 3,161,008 | 12/1964 | Shepley et al. | 56/474 |
| 3,243,028 | 3/1966 | Tufts | 193/5 |
| 3,411,436 | 11/1968 | Fisher | 100/188 |

Primary Examiner—Joseph E. Valenza
Assistant Examiner—Gene A. Church
Attorney, Agent, or Firm—Martin Fruitman; Frank A. Seemar; John B. Mitchell

[57] ABSTRACT

An improved quarter-turn hay bale chute which prevents skewing and bounce of the bale as it hits the ground. An adjustable flap is set to narrow the lowest portion of the bale "drop window" so that the fully turned bale is restricted in its lateral movement and prevented from dropping out of line with the direction of motion of the hay baler. The restriction formed between the adjustable flap and the deflector also serves as a brake to slow the free fall of the bale and thus decreases bouncing which is a further cause of misalignment.

4 Claims, 1 Drawing Figure

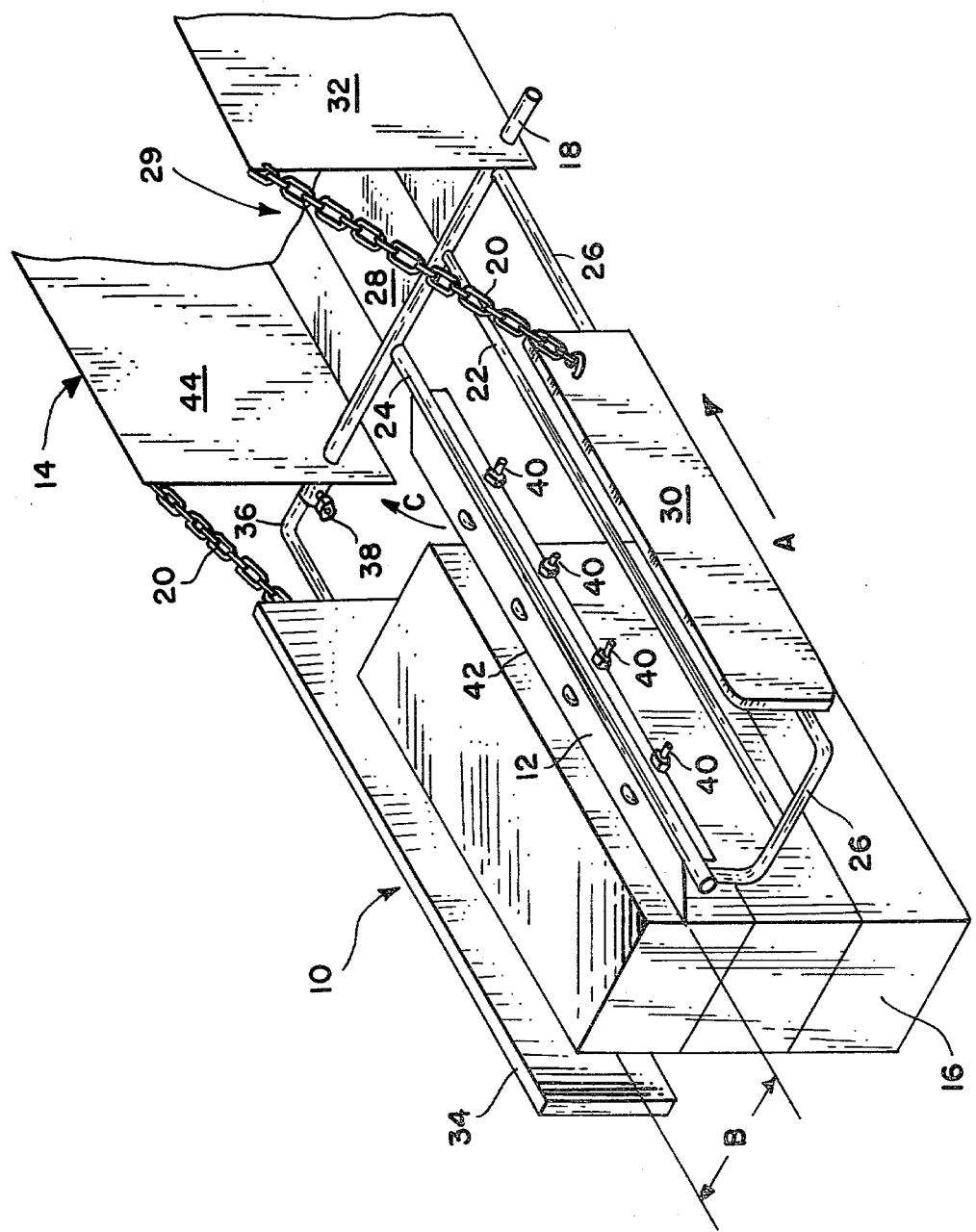

BALE RESTRICTIVE FLAP

BACKGROUND OF THE INVENTION

This invention relates generally to agricultural machines and more specifically to quarter-turn discharge chutes for hay balers.

Hay baling machines have conventionally been constructed to tie the finished bales with cord or wire and deposit them onto rear discharge chutes. The balers operate so that as the bales leave the binding operation they are bound with the cord or wire loops in a vertical plane. Since it is generally understood that when bales remain in the field or in storage in that position, with the binding on the bottom, drying is retarded and the binding deteriorates, several devices have been developed for the purpose of rotating the bales one-quarter turn before or during discharge.

One such device, described in U.S. Pat. No. 3,243,028, is typical of the existing art in that it involves a bale chamber extension which is essentially a bale chamber structure with slightly more than one-half the bottom surface removed and an out-rigger deflector structure attached to the side from which the half-chute is missing.

Such a construction permits a bale, which is pushed free of the bale chamber by succeeding bales, to tip sideways off of the extension. As it rotates a quarter turn it drops to the ground and is prevented from further lateral roll by the out-rigger deflector. While the out-rigger deflector also restricts misalignment to some extent, the spacing between the support ledge of the extension and the deflector must, because of the geometry of the rotating bale, be large enough to permit considerable misalignment of the bale once it is resting on the ground on its narrow surface. It is always the narrower surface which is the unbound surface.

Alignment of bales in the field has become more and more important as labor costs have gone up and machinery speeds have increased. Bale pick-up machines require good alignment of the bales for rapid operation without the use of additional manpower to first realign the bales. However, similar increases in baler ground speeds have added to the causes of misalignment. Hay bales dropping from quarter-turn discharge chutes which are moving fast tend to bounce more than those falling from slower moving balers, because of the bale's own increased momentum. Thus, bales dropped from fast moving balers still have momentum and are bouncing when they are no longer within conventional chutes, and, once moving freely, may end up misaligned.

It is, therefore, an object of the present invention to provide a bale turner which will turn and more accurately align bales dropping from fast moving balers.

It is a further object of this invention to restrict the bouncing of discharged bales and to prevent bales from interfering with the motion of the baler.

It is a still further objective of this invention to permit the positioning of a bale chute essentially horizontally so that ground clearance problems are minimized and bales make contact with the ground more uniformly to prevent skewing as contact is made.

SUMMARY OF THE INVENTION

The present invention overcomes the inadequacies of conventional quarter-turn bale chutes by the use of an adjustable restrictive flap which slows the fall of the bale as it drops to the ground. The restrictive flap also reduces the clearance existing between the dropping bale and the bale chute, thereby preventing the bale from orienting askew relative to the sides of the chute.

The invention requires the "window" through which the bale drops to be wide enough at the top, at the horizontal plane of the discharge chute, to permit the bale to rotate without hanging up between the support ledge and the out-rigger deflector. However, the window is reduced as it approaches the ground to permit the narrower dimension of the already turned bale to just slide through without providing excess clearance to allow the bale to turn out of orientation with the line of motion of the baler.

The "pinch" effect of the restrictive window also acts as a brake on the falling bale so that the vertical motion of the bale is slowed. Since it is vertical momentum that causes a bale to bounce, a slowly dropping bale has much less tendency to bounce and become misaligned or entangled in the baler.

A further feature of the present invention is the adjustability of the restrictive flap which permits easy field adjustment of the touch-down clearance between the bale and the chute and also the braking action of the restrictive flap. The adjustment is accomplished by simply loosening several bolts and rotating the flap around its point of attachment to the quarter-turn chute. The adjustment capability is continuous between the one extreme of a vertical position, which eliminates all restricting action, to the other extreme of just barely permitting the bale to drop.

The restrictive flap has an additional position of adjustment, however, in which the flap is secured essentially horizontal, which considerably increases the versatility of the invention.

The conversion from use of conventional quarter-turn chutes to a straight discharge chute generally involves unhooking and removing the quarter-turn chute and attaching a flat bottomed loading chute. The present invention can, however, be quickly converted into a non-turning loading chute by simply turning the adjusting flap to the horizontal position and moving the out-rigger deflector to its innermost position toward the vertical side of the baler bale chamber. In such an arrangement the present invention serves as a full extension of the baler bale chamber since the deflector acts as one side and the horizontally oriented restrictive flap completes the bottom surface of the chute. No unhooking or removal is necessary and reconversion to quarter-turn operation is always easily available since all the necessary equipment continues to be carried by the hay baler at all times.

BRIEF DESCRIPTION OF THE DRAWING

The FIGURE is a perspective view of the preferred embodiment of the invention mounted upon a simple quarter-turn chute.

DESCRIPTION OF THE PREFERRED EMBODIMENT

The preferred embodiment of the invention is shown in the FIGURE where quarter-turn chute 10, which includes restrictive flap 12, is shown attached to baler 14. Bale 16 is shown essentially fully turned and already in its final required alignment parallel to the baler line of motion A.

Quarter-turn chute 10 is conventionally attached to baler 14 by rotating axle 18 and held in the near-horizontal position by two support chains 20. Such a suspension permits easy adjustment of the support ledge formed by bars 22, 24 and 26 for the desired relationship to bale support 28 at the bottom of baler 14's bale chamber 29.

Sidewall 30, in approximate alignment with baler vertical wall 32, acts as a continuation of vertical wall 32 and prevents bales from falling off that edge of the support ledge. Outrigger deflector 34, held in position by the internal coaxial fit of bar 36 into axle 18, which is clamped by lock fitting 38, is adjustable in its horizontal position to permit adjustment of its distance from bar 24.

Restrictive flap 12 is designed to rotate about the innermost upper edge of the support ledge, formed, in the preferred embodiment, by bar 24. The particular design shown is constructed by wrapping one edge of restrictive flap 12 around bar 24 and using several nut and bolt pairs to clamp restrictive flap 12 onto bar 24. Tightening nuts and bolts 40 locks restrictive flap 12 in any rotated position around bar 24. As restrictive flap 12 is rotated about bar 24, distance B, between lower edge 42 of restrictive flap 12 and outrigger deflector 34, is varied continuously from a maximum when restrictive flap 12 is vertically downward to a minimum when restrictive flap 12 is horizontal. This continuous adjustment permits sizing distance B, the acutal "window" through which bale 16 falls, to act both as a brake to retard the downward fall of bale 16 and to restrict the degree of misalignment which may occur between the edge 42 and bale 16.

In normal use the present invention is adjusted for operation in the following manner:

First, deflector 34 is moved outward by loosening lock fitting 38 and sliding bar 36 within axle 18. Deflector 34 is moved outward to a distance sufficient so that bale 16, as it tips sideways off of the support bars, clears deflector 34 and does not stop rotating because of interference at its corner.

Then, restrictive flap 12 is rotated in direction C, starting with edge 42 at its lowest point until dimension B, from deflector 34 to lower edge 42 provides minimal clearance for the width of bale 16. This clearance is typically satisfactory with one-half to three-quarters of an inch clearance on each side of the bale.

A further advantage of the present invention is its ability to convert very easily from quarter-turn operation to straight loading chute operation. Usually such a conversion involves detaching the quarter-turn chute from the baler and replacing it with a full-bottomed loading chute. With the present invention, however, all that is required is the loosening of nut-bolt pairs 40 and rotating restrictive flap 12 in direction C until it is in an essentially horizontal orientation. With the nuts and bolts tightened again, restrictive flap 12 thus forms a structural addition to chute 10 which duplicates the function of the bottom of a conventional loading chute. Out-rigger deflector 34 is then moved to its innermost position toward baler vertical wall 44 to complete the conversion to a loading chute which can be used to either drop unturned bales to the ground or feed them directly to a following wagon.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the structure for rotating restrictive flap 12 around the position of bar 24 can be of varied configurations. One such structure is a restrictive flap rigidly attached to a support bar which is itself rotated at lockable fittings at its support points.

What is claimed as new and desired to be secured by Letters Patent of the Unites States is:

1. In a quarter-turn bale chute attachable to a hay baler, wherein an extension of a bale chamber is constructed with a partial support ledge from which a bale drops to the ground while rotating sideways off of the partial support ledge, and the bale is prevented from further rotation on the ground by an outrigger deflector positioned on the side of the quarter-turn bale chute remote from the partial support ledge, the combination thereof with a restrictive flap attached to and rotatable about the innermost upper edge of the partial support ledge.

2. The combination recited in claim 1 wherein the restrictive flap is lockable in any position in its path of rotation.

3. The combination recited in claim 1 wherein the restrictive flap is rotatable and lockable in a position wherein it serves as a sideways structural extension of the partial support ledge thereby preventing bales from rotating off of the partial support ledge.

4. The combination recited in claim 1 further comprising means for adjusting the outrigger deflector in regard to its distance from the edge of the partial support ledge around which the restrictive flap rotates.

* * * * *